United States Patent [19]

Tajima

[11] Patent Number: 4,655,304

[45] Date of Patent: Apr. 7, 1987

[54] COUNTING IN-LINE SYSTEM

[75] Inventor: Noriyasu Tajima, Shizuoka, Japan

[73] Assignee: Tokyo Electric Co., Ltd., Tokyo, Japan

[21] Appl. No.: 768,054

[22] Filed: Aug. 22, 1985

[30] Foreign Application Priority Data

Aug. 28, 1984 [JP] Japan .................................. 59-179093
Aug. 28, 1984 [JP] Japan .................................. 59-179094

[51] Int. Cl.⁴ ...................... G01G 23/38; G01G 19/40; G06F 15/20
[52] U.S. Cl. ............................................. 177/4; 177/25; 364/466
[58] Field of Search ................... 177/1, 25, DIG. 1, 4; 364/466

[56] References Cited

U.S. PATENT DOCUMENTS

| | | | |
|---|---|---|---|
| 3,459,271 | 8/1969 | Susor et al. | 177/25 |
| 3,632,988 | 1/1972 | Yamawaki. | |
| 3,716,697 | 2/1973 | Weir | 177/1 X |
| 3,899,775 | 8/1975 | Larsen | 177/DIG. 1 |
| 3,906,208 | 9/1975 | Rogers | 177/DIG. 1 |
| 4,574,352 | 3/1986 | Coppola et al. | 364/466 |

Primary Examiner—George H. Miller, Jr.
Attorney, Agent, or Firm—Oblon, Fisher, Spivak, McClelland & Maier

[57] ABSTRACT

In counting in-line system of the invention, a center machine and a plurality of scales are in-line connected, centralized control of transaction data per each weighed or non-weighed article registered in the scale is performed by the center machine, and according to receipt issuing request from side of the scale, print data is supplied from the center machine to the scale so as to issue the receipt, thereby fine control of the transaction data and arbitrary receipt issuing at side of the scale can be effected and the counting in-line system becomes suited to each shop and easy for the use. The transaction data is controlled using two independent numbers, the customer number and the clerk number, thereby the processing can be performed corresponding to the floating system and the clerk fixed system.

7 Claims, 28 Drawing Figures

FIG. 8

(a) COMMAND TEXT

| SOH | AD1 | AD2 | TR# | STX | F T S E O C- N | COM 123 | ETX | BCC |
|---|---|---|---|---|---|---|---|---|

(b) SETTING TEXT

| SOH | AD1 | AD2 | TR# | STX | F T S E O C- N | TYPE NO. | MACHINE NO. | SECTION NO. | DATA LENGTH | ITEM 1 ~ ITEM n | (ETM) | ETX | BCC |
|---|---|---|---|---|---|---|---|---|---|---|---|---|---|

(c) STATE RESPONSE TEXT

| SOH | AD1 | AD2 | TR# | STX | F T S E O C- N | TYPE NO. | MACHINE NO. | STATUS | ETM | ETX | BCC |
|---|---|---|---|---|---|---|---|---|---|---|---|

(d) STATE RESPONSE TEXT

| SOH | AD1 | AD2 | TR# | STX | F T S E O C- N | TYPE NO. | MACHINE NO. | STATUS | ETM | ETX | BCC |
|---|---|---|---|---|---|---|---|---|---|---|---|

(e) TRANSACTION INQUIRY (REQUEST) PLU SETTING, OMIT

| SOH | AD1 | AD2 | TR# | STX | F T S E O C- N | TYPE NO. | MACHINE NO. | SECTION NO. | DATA LENGTH | ITEM | ETM | ETX | BCC |
|---|---|---|---|---|---|---|---|---|---|---|---|---|---|

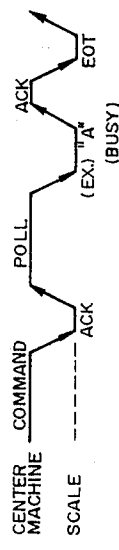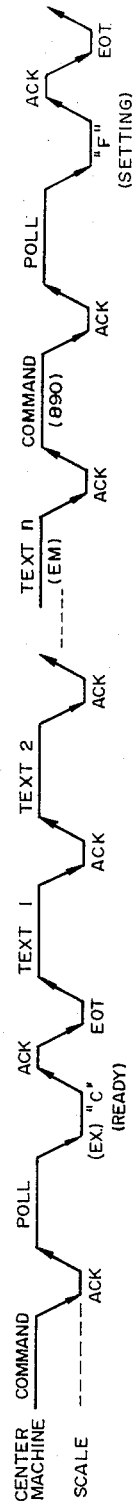

FIG. 12

| | | | | | | | | | |
|---|---|---|---|---|---|---|---|---|---|
| S T X | F | TYPE | MACHINE No. | SECTION | DATA LENGTH | DATE | | H | M | S |
| STX | 2 | N N | N N N N | N N | 0 7 0 0 | N N N | N N N N N N | N N | N N | N N |

Header row: RECEIVED DATA

| BAR CODE INFORMATION (WEIGHED) | BAR CODE STATUS (WEIGHED) | BAR CODE INFORMATION |
|---|---|---|
| N N N N N N N N | N N N N N N N N N N | N N N N |

| (NOT WEIGHED) | BAR CODE STATUS (NOT WEIGHED) | SHOP CODE | STATUS |
|---|---|---|---|
| N N N N | N N N N N N N N N N | N N N N N | 0 0 0 0 |

| | SHOP NAME (HEAD INFORMATION) |
|---|---|
| O n | A A A A A A A A A A A A A A A A A A A A A A A |

| |
|---|
| A A A A A A A A A A A A A A A A A A A A A A A A |

| |
|---|
| A A A A A A A A A A A A A A A A A A A A A A A A |

| | ADDRESS |
|---|---|
| A A A A A A A A A | A A A A A A A A A A A A A A A A |

| | | E T X |
|---|---|---|
| A A A A A A A A | E M | ETX |

FIG.13

| S T X | F | COMMAND | E M | E T X |
|---|---|---|---|---|
| | D | 7 8 1 | | |
(RECEIVED DATA)

FIG.14

| S T X | F | TYPE | MACHINE No. | SECTION | DATA LENGTH | CLERK ① | CLERK ② | CLERK ③ | CLERK ④ |
|---|---|---|---|---|---|---|---|---|---|
| X | 2 | N N | N N N N | 0 7 8 1 | N N N | N N N | N N N | N N N | N N N |

(RECEIVED DATA)

| CLERK ⑤ | CLERK ⑥ | CLERK ⑦ | CLERK ⑧ | CLERK ⑨ | CLERK ⑩ | E M | E T X |
|---|---|---|---|---|---|---|---|
| N N N | N N N | N N N | N N N | N N N | N N N | | |

| TRANSMISSION DATA | | | | | | | | | |
|---|---|---|---|---|---|---|---|---|---|
| STX | F | TYPE | MACHINE No. | SECTION | DATA LENGTH | CUSTOMER No. | CLERK No. | SORT | PLU No. |
| STX | 5 | N N | N N N | N N | O O O O | N N N | N N N | N N N N | O O N N N N |

| WEIGHT OR NUMBER | UNIT PRICE | PRICE | ARTICLE |
|---|---|---|---|
| N N N N | N N N N | N N N N N | A A A A A A A A A A A A A A |

| EM | ETX |
|---|---|

| TRANSMISSION DATA | | | | | | | | |
|---|---|---|---|---|---|---|---|---|
| STX | F | TYPE | MACHINE No. | SECTION | DATA LENGTH | CUSTOMER No. | CLERK No. | EM | ETX |
| STX | 5 | N N | N N N N | N N | O 3 O O | N N N | N N N | N N N N | EM | ETX |

| | | | | | TRANSMISSION DATA | | | | |
|---|---|---|---|---|---|---|---|---|---|
| S T X | F | TYPE | MACHINE No. | SECTION | DATA LENGTH | CUSTOMER No. | CLERK No. | E M | E T M |
| X | 5 | N N | N N N N | O I O O | N N | N N N | N N N | | |

| | | | | | RECEIVED DATA | | | | |
|---|---|---|---|---|---|---|---|---|
| S T X | F | TYPE | MACHINE No. | SECTION | DATA LENGTH | CUSTOMER No. | CLERK No. | TOTAL AMOUNT |
| X | 5 | N N | N N N N | O I O O | N N | N N N | N N N | N N N N N N N |

| E M | E T M |
|---|---|

FIG. 23

| | | | | | TRANSMISSION DATA | | | | | |
|---|---|---|---|---|---|---|---|---|---|---|
| S T X | F | TYPE | MACHINE No. | SECTION | DATA LENGTH | CUSTOMER No. | CLERK No. | E M | E T M |
| X | 5 | N N | N N N N | 0 1 0 1 | N N N | N N N N | N N N N | | |

FIG. 24

| | | | | | RECEIVED DATA | | | |
|---|---|---|---|---|---|---|---|---|
| S T X | F | TYPE | MACHINE No. | SECTION | DATA LENGTH | CUSTOMER No. | CLERK No. | SORT |
| X | 5 | N N | N N N N | 0 1 0 1 | N N N | N N N N | N N N N | |

| PLU No. | WEIGHT OR NUMBER | UNIT PRICE | PRICE |
|---|---|---|---|
| 0 0 N N N | N N N N | N N N N | N N N N N |

| ARTICLE | SORT | SUM TOTAL NUMBER |
|---|---|---|
| A A A A A A A A A A A A A A | 2 0 | N N N N |

| SUM TOTAL AMOUNT | E M | E T X |
|---|---|---|
| N N N N N N N | | |

COUNTING IN-LINE SYSTEM

BACKGROUND OF THE INVENTION

1. Field of the Invention:

The present invention relates to counting in-line system adopted in a super-market or the like.

2. Description of the Prior Art:

Since a scale (counter) with receipt issuing function in the prior art has many functions such as sorting, summing-up or setting, it is frequently used in a single body. When a plurality of scales each having such many functions are in-line connected to a center machine and the centralized control of all services such as setting or summing is performed by the center machine, the input action at a shop is eliminated significantly and the shop can be intent on the business activity. In the in-line connection, however, since batch processing is performed at setting and summing-up of the PLU data, the transaction data coming from the scale cannot be controlled finely. Consequently, this system cannot be always suited to the shop and easy for the use.

OBJECT AND SUMMARY OF THE INVENTION

An object of the invention is to provide counting in-line system wherein the transaction data coming from the scale is controlled finely in the center machine so that the system becomes suited to each shop and easy for the use.

In the invention, the center machine and a plurality of scales are in-line connected, the centralized control of the transaction data per each counting article registered at the scale is performed in the center machine, and if the receipt issuing is requested from the scale side the print data is supplied from the center machine to the scale so as to issue the receipt, thereby the fine control of the transaction data and the arbitrary receipt issuing at the scale side can be performed and the system becomes suited to the shop and easy for the use. In this case, if the transaction data is controlled in two independent numbers, the customer No. and the clerk No., processing corresponding to floating system and clerk fixed system can be performed.

Studying it more specifically, selling system in a shop is classified into floating system and clerk fixed system. The floating system is familiar in Europe but not in Japan, where one clerk performs all selling services to one customer. On the other hand, in the clerk fixed system as seen widely in a super-market or the like, one clerk performs selling services to customers at one or several scales. Although there are the plural selling systems, the transaction data cannot be controlled finely and therefore the selling service suited to the systems cannot be performed.

An example of changing of the floating system and the clerk fixed system is as follows. The floating system is adopted from Monday to Thursday, since the shop is not crowded and the number of clerks may be small; the clerk fixed system is adopted in Friday and Saturday, since customers are centralized then.

In the floating system, a clerk registers an article in each counter and a customer does not receive the article at each registering state. When the customer total receipt is issued at any scale, the customer receives the articles together and the accounts are settled in the register based on the customer total receipt. In this selling system, both the customer No. and the clerk No. are inputted.

In the clerk fixed system, an article is registered and at the same time a customer received the article at each counter, and the customer total receipt is issued at any scale. The accounts are settled at the register based on the customer total receipt. In this selling system, only the clerk No. is inputted.

BRIEF DESCRIPTION OF THE DRAWINGS

FIG. 8(*a*)–(*e*) is a diagram illustrating various texts;

FIG. 9 is a sequence diagram illustrating response state to a command;

FIG. 10 is a sequence diagram of a setting text;

FIG. 11 and FIG. 12 are diagrams illustrating a data format in initial setting;

FIG. 13 and FIG. 14 are diagrams illustrating a data format in clerk assigning;

FIGS. 23 and 24 are diagrams illustrating a data format in text of receipt issuing request.

DETAILED DESCRIPTION OF PREFERRED EMBODIMENTS

Figure 1:
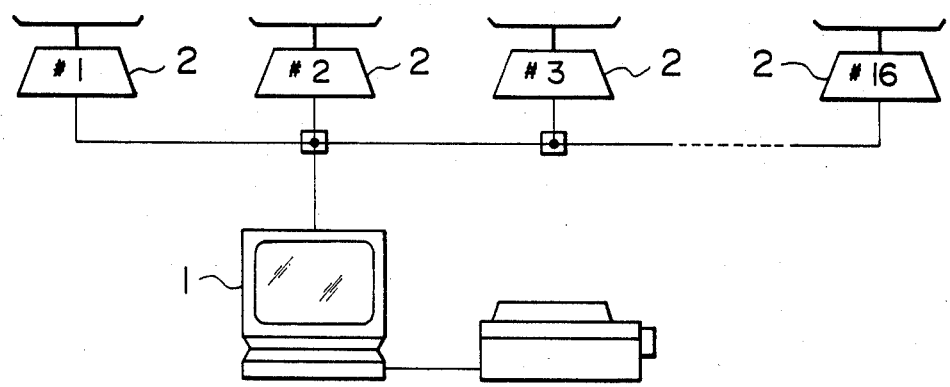
FIG. 1 is a system constitution diagram.
Figure 2:
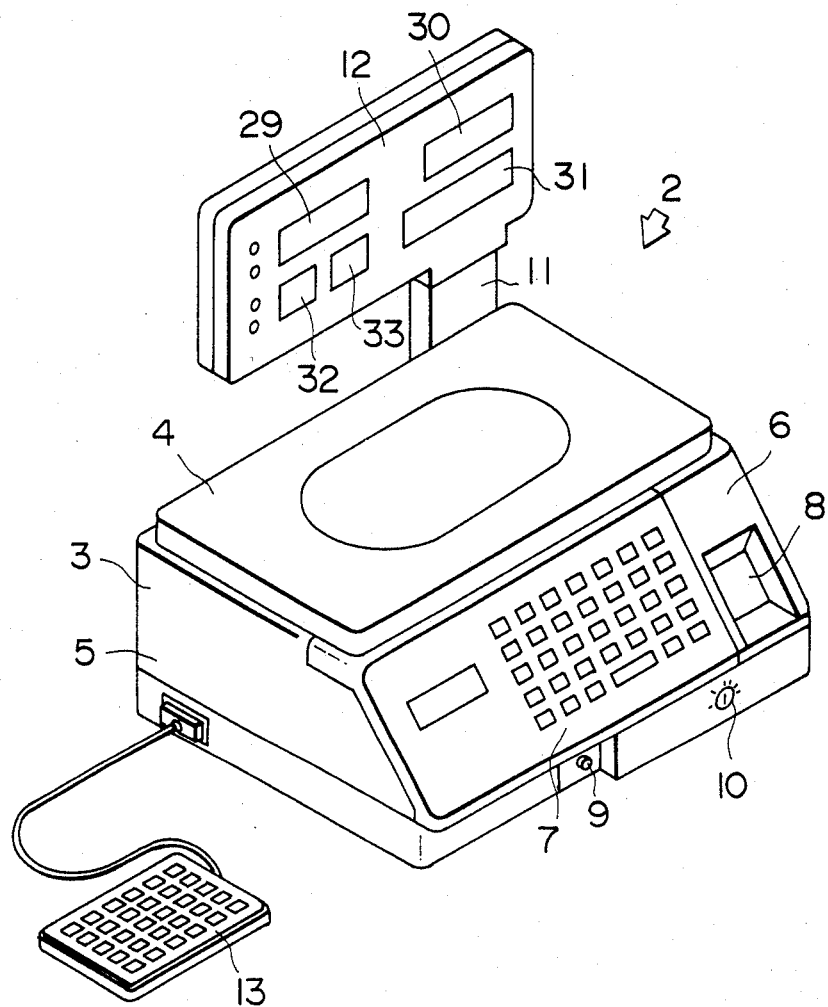
FIG. 2 is a perspective view of appearance of a scale.

An embodiment of the invention will now be described referring to the accompanying drawings. FIG. 1 shows a system constitution, and a center machine 1 is in-line connected to scales 2 composed of #1–#16. The center machine 1 may be ECR (cash register) for example. Each scale 2 has receipt issuing function, and appearance constitution thereof is as shown in FIG. 2. A scale body 3 is provided at upper side with a tray 4, and a weight measuring member 5 is formed. A thermal printer 6 is installed on one side of the scale body 3. A keyboard 7 with a number of keys arranged thereon is installed on front surface of the scale body 3. A receipt issuing port 8 is formed on front surface of the thermal printer 6. A zero switch 9 and a register mode changing switch 10 of key switch are installed at lower side of the front surface of the body 3. A strut 11 is installed on rear surface of the body 3, and an indicator 12 is mounted on the strut 11. A remote keyboard 13 is connected to side surface of the body 3.

Figure 3:
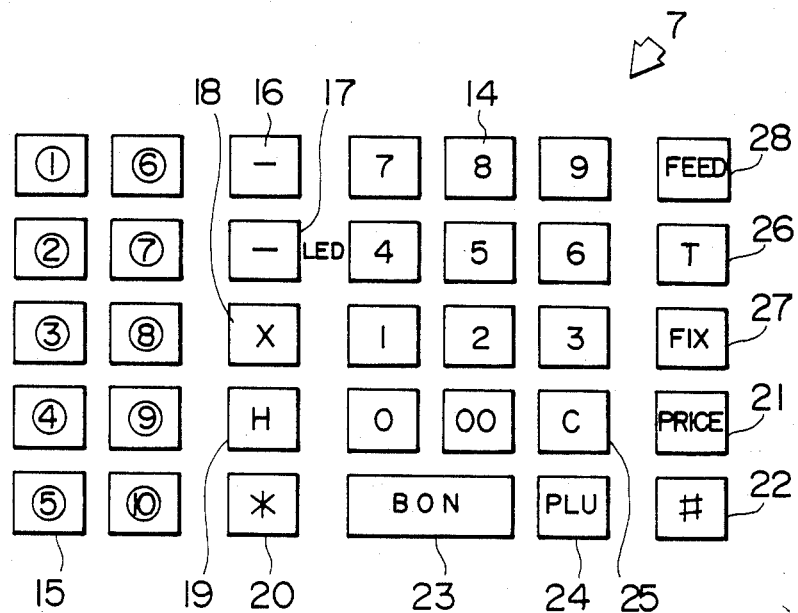
FIG. 3 is a front view of a keyboard.

Referring to FIG. 3, the keyboard 7 is provided with ten-keys 14 comprising numerals 0–9 and other various keys. Symbols 1–10 represent clerk keys 15 to assign clerk Nos. by DLL from side of the center machine 1. Symbol "−" represents a minus key 16 for inputting the returned article amount. Symbol "−" (red) represents a cancel key 17 for the immediate correction. Symbol "×" represents a multiplication key 18. Symbol "H" represents a declaration key 19 of non-weighed article in Non-PLU. Symbol "*" represents a total-amount indicating key 20. Symbol "PRICE" represents a declaration key 21 of weighed article in Non-PLU. Symbol "#" represents a declaration key 22 of customer No. input. Symbol "BON" represents a print starting key 23. Symbol "PLU" represents a PLU calling key 23. Symbol "C" represents a register clear key 25. Symbol "T" represents a tare key 26. Symbol "FIX" represents a fixing key 27 for unit price/tare. Symbol "FEED" represents a paper feed key 28.

Figure 4:
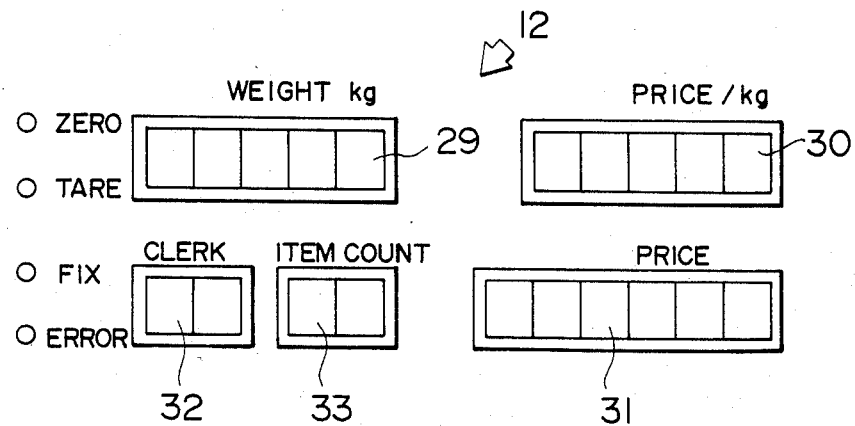
FIG. 4 is a front view of an indicator.

The Indicator 12 is of the same indicating type on both faces, and provided with a weight indicating member 29, a unit price indicating member 30, a price indicating member 31, a clerk key No. indicating member 32, and an item count number indicating member 33 as shown in FIG. 4. The clerk key member 32 indicates numbers of the clerk key 15 comprising 1-10. The item count number indicating member 33 indicates the item count number when the receipt issuing is requested at side of the scale 2.

Figure 5:
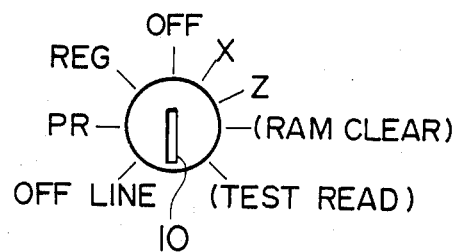
FIG. 5 is a front view of a register mode changing switch.

FIG. 5 shows the register mode changing switch 10. Position "REG" represents normal operation mode such as weighed registration, non-weighed registration, total amount indication, customer total amount print or the like. Position "PR" represents program mode where the machine number, scale address, existence of sign-off function can be set. Position "X" or "Z" represents inspection or settling mode of the summing-up content per time band. Position "OFF LINE" represents mode where the scale 2 can be operated individually at the in-line off state.

Figure 6:
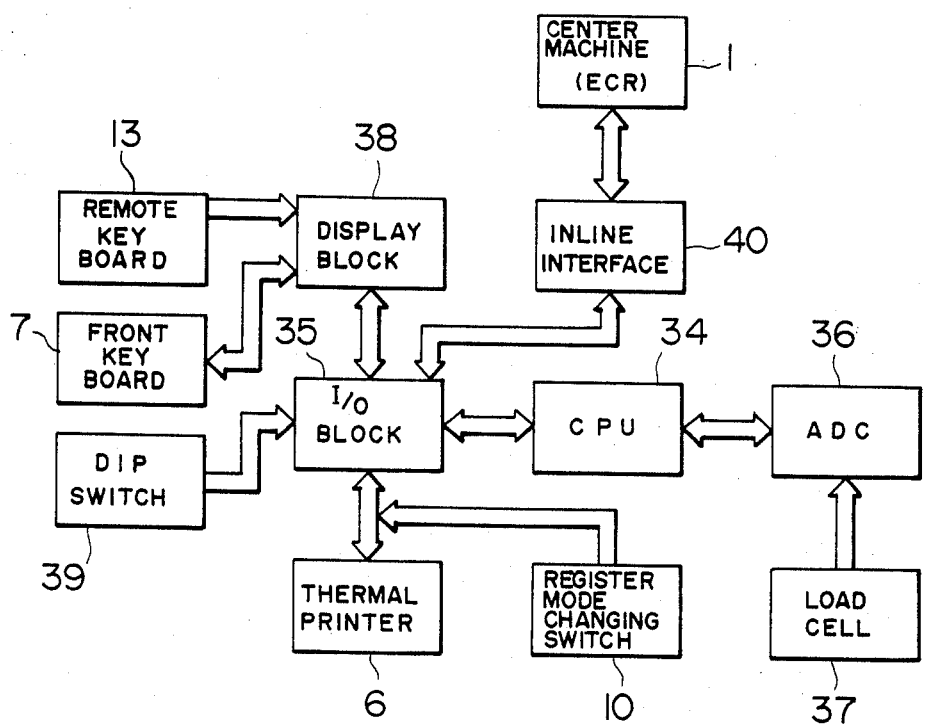
FIG. 6 is a system block diagram.

FIG. 6 shows electric connection of content of the scale 2. In FIG. 6, CPU 34 is connected to I/O block 35 and ADC 36, and the ADC 36 is connected to a load cell 37 of the weight measuring member 5. The I/O block 35 is connected to the thermal printer 6, and also to a display block 38, a dip switch 39 and the register mode changing switch 10. The display block 38 is connected to the keyboard 7 and the remote keyboard 13. The scale 2 is connected through an in-line interface 40 to the center machine 1.

Figure 7:
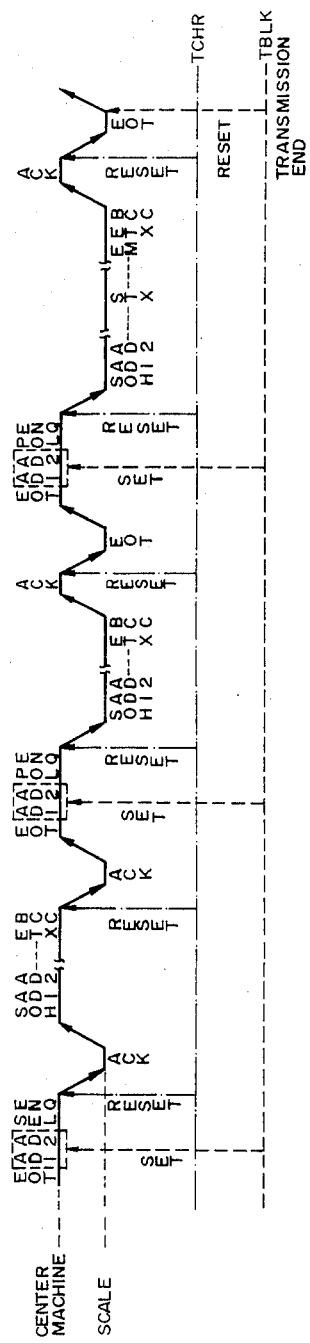
FIG. 7 is a sequence diagram illustrating information transmission state between a center machine and a scale.

FIG. 7 shows the basic state of in-line processing between the center machine 1 and the scale 2. The scale 2 performs the timer supervision to the center machine 1 using two sorts of timers, an interblock timer (TBLK) and an intercharacter timer (TCHR). The intercharacter timer TCHR is set at the beginning of each character and reset at the end. If the reset is delayed from the setting time, error signal as time-out state is generated. The interblock timer TBLK supervises the end of signal block. From the center machine 1, signal EOT (END OF TEXT) is generated, and then address of the scale 2 of AD1, AD2 is set. Process is started at signal SEL (select), and response of the opposite station is urged at signal ENQ. Signal ACK (acknowledge) is generated at side of the scale 2. At the center machine, signal SOH (START OF HEADER) is generated and then command signals from AD1 to ETX are generated and signal BCC (block check character) is finally generated. Signal ACK (acknowledge) is generated from the scale 2. At the center machine 1, signal EOT is generated on the basis of the ACK and then scale address is set. Signal POL (data request) is generated, and response is urged at signal ENQ. At the scale 2, data from AD1 to ETX are interposed between signals SOH and BCC and transmitted. Signal ACK is generated at the center machine 1, and signal EOT is generated at the scale 2. At the center machine 1, scale address is set from the signal EOT, signal POL (data request) is generated and response is urged at signal ENQ. At the scale 2, data including EM (end message) are transmitted between signals SOH and BCC. Signal ACK is generated at the center machine 1 and signal EOT is generated at the scale 2, thus the transmission is ended.

During such data transmission, the intercharacter timer TCHR is reset at the character end state of the center machine 1 as shown in dash-and-dot line. The setting is performed at the character starting state although not shown in the figure. Consequently, the timer TCHR is reset as long as the abnormal condition does not exist. If the abnormal condition is produced, the TCHR does not come to the character end but to the time-out state. The interblock timer TBLK is reset at setting of scale address of AD1, AD2. The timer TBLK is set again at each address setting, and reset at the end of data transmission. The reset is performed as a result of the normal ending of sequence. At the abnormal condition, transmission does not come to the end state but the time-out state thereby the error signal is generated.

Content of the individual data will now be described in detail. First, text transmitted or received between the center machine 1 and the scale 2 will be descried. Texts transmitted from the center machine to the scale 2 include command text, setting text to inquiry (request), and state response text. Texts transmitted from the scale 2 to the center machine 1 include state response text and text of transaction inquiry (request) .PLU setting. omitting.

The command text is instruction message supplied from the center machine 1 to the scale 2, and its format is shown in FIG. 8(a). The scale 2 performs services such as setting, inspection or the like corresponding to sorts of the command. In this format, F-section is "D" in ASCII code, and COM part defines content of the command. The command becomes setting service if COM belongs to order of 700, and it becomes inspection service if COM belongs to order of 800. More specifically, COM 700 means the initial setting, COM 720 the whole PLU setting, COM 721 the PLU setting, COM 741 the unit price changing, COM 781 the clerk key assigning, COM 890 the setting inspection (signal to confirm the setting service being normally ended), and COM 892 the receipt inspection (signal to confirm the receipt print text to the receipt issuing request being normally received).

The setting text is setting message supplied from the center machine 1 to the scale 2, and its format is shown in FIG. 8(b). The scale 2 stores content of the message and performs the setting service. In this format, F-section is "2" in ASCII code.

The setting text to inquiry (request) is setting message supplied from the center machine 1 to the scale 2 in response to inquiry (request), and its format is similar to the setting text in FIG. 8(b) except that F-section is "5" in ASCII code. This text becomes text of content of transaction buffer to the receipt issuing request text or total amount text to the total amount request.

The state response text is text to inform state of the center machine 1 in response to transaction inquiry (request) .PLU setting. omitting from the scale 2, and its format is shown in FIG. 8(c). In this format, F-section varies depending on state of the center machine 1. If F-section = "A" (ASCII code), the command becomes BUSY response. Response to this text is effected when the center machine 1 incompletely receives the text such as transaction inquiry (request), PLU setting or when service to the text cannot be performed after the complete receiving. On the other hand, if F-section = "C" (ASCII code), the command becomes READY response. Response to this text is effected when the center machine 1 is at READY state to the text such as transaction inquiry (request), PLU setting or when the text is received completely.

Among texts transmitted from the scale 2 to the center machine 1, the state response text is text to inform state of the scale 2 in response to the command from the center machine 1, and its format is shown in FIG. 8(d). In this format, F-section varies depending on state of the scale 2. If F-section = "A" (ASCII code), the command becomes BUSY response. Response to this text is effected when the scale 2 cannot perform the setting service. If F-section = "C" (ASCII code), the command becomes READY response. Response to this text is effected when the scale 2 is at READY state to the command of setting. If F-section = "F" (ASCII code), response is effected after the setting text receiving is finished. When the scale 2 receives the whole setting text normally, response is effected to the setting inspection command "890" or the receipt inspection command "892". If F-section = "G" (ASCII code), the command becomes incomplete receiving response of the setting text. Response to this text is effected when the scale 2 cannot receive the setting text finally.

Text of transaction inquiry (request) .PLU setting. omitting is transmitted to the center machine 1 in response to POLLING when the scale 2 has data to be transmitted to the center machine 1, and its format is shown in FIG. 8(e). In this format, F-section = "5" (ASCII code).

In text such as use transaction inquiry (request) shown in FIG. 8(e), "section" will be described. Section "0000" means the weight measuring text. Section "0100" means the total amount request, and section "0101" means the receipt issuing request. If any of above requests is accepted, the state response is not transmitted from the center machine 1 but the text is transmitted. Section "0200" means the PLU setting text, section "0201" the PLU eliminating text, and section "0300" the sign-off state.

The basic application text will be described. FIG. 9 shows an example of the state response to the command. In FIG. 9, signal ACK (acknowledge) is generated to the command from the center machine 1, and when the state response becomes F-state = "A" (BUSY) to signal POLL (data request). Since response to the command cannot be effected, signal EOT is generated and the process is ended.

FIG. 10 shows an example of the state response to the setting text. Signal ACK (acknowledge) is generated from the center machine 1 in response to the command (any of 700, 720, 721, 741, 781) being the setting service, and then the state response at side of the scale 2 to POLL becomes F-section = "C" (READY), thereby the setting texts TEXT1 - TEXTn from the center machine 1 are received in sequence. If the last text TEXTn including EM has been received, the command = 890 = - setting inspection is transmitted from the center machine 1 so as to confirm the setting service being normally performed. The state response of F-section = "F" is received from side of the scale 2 thus the setting service is finished.

Initial setting by command = 700 among the setting services will now be studied as a specific example. FIG. 11 shows its command text. When the setting text can be received on the basis of the command, response is effected at F-section = "C" (READY) in the state response. And then the scale 2 receives the setting text of the data format as shown in FIG. 12 thereby the initial setting service is performed. In such data format (also in that hereinafter described), "N" represents numerals of 0–9, "n" represents data corresponding to bits, "A" represents all characters including alphanumeric characters assigned by the ASCII code table except for the control characters (00–1F), and "0" represents the fixed value. Regarding machine No., in data from the center machine 1 to the scale 2, the scale 2 normally receives "0000" and does not check it. However, data from the scale 2 to the center machine 1 transfers the machine No. of four columns set at each machine (scale). The status of "00000n" in the setting text shown in FIG. 12 represents the changing of customer/clerk system. If $n=0$, the selling system becomes clerk system; if $n=1$, it becomes customer system. The clerk system corresponds to the floating system, and the customer system corresponds to the clerk fixed system. The floating system is familiar in Europe but not in Japan, where one clerk performs all selling services to one customer. On the other hand, in the clerk fixed system as seen widely in a super-market or the like, one clerk performs selling services to customers at one or several scales. Thus in the initial setting, the changing information between both systems is in-line supplied from the center machine to each scale 2, thereby selection of the selling system in floating system or in clerk fixed system may be set arbitrarily.

The clerk assigning by command = 781 among the setting services will be studied. FIG. 13 shows its command text. When the clerk assigning is possible on the basis of command, response is effected at F-section = "C" (READY) in the state response. And then the scale 2 receives the text for clerk assigning of the data format as shown in FIG. 14 thereby the clerk assigning service is performed.

Figures 15, 16, 17:
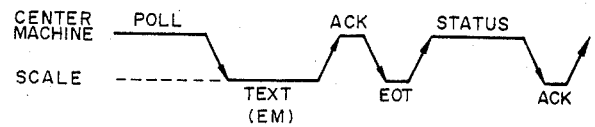
FIG. 15 is a sequence diagram of transaction data.
FIG. 16 is a diagram illustrating a data format in transaction text.
FIG. 17 is a diagram illustrating a data format in sign-off text of transaction.

The transaction sequence will be described. In this sequence, when the scale 2 has data to be transmitted to the center machine 1 as above described, it is transmitted to the center machine 1 in response to POLLING. FIG. 15 shows sequence in the case of transaction, sign-off, PLU setting, PLU omitting. When text is transmitted from side of the scale 2 in response to the POLLING from the center machine 1 and the transaction data or the like is registered to the center machine 1, the state response "C" is transferred to side of the scale 2. If it is not registered, the state response "A" together with the error status is transferred to side of the scale 2. FIG. 16 shows the data format of text in the case of transaction as a specific example. Regarding customer No. and clerk No. shown in the data format, in the case of clerk system, the clerk No. is set to both data of clerk No. and customer No. and transferred to the center machine 1. On the other hand, in the case of customer system, both the clerk No. and the customer No. are transferred to the center machine 1 but only the customer No. is noticed in the center machine 1. According to the transaction sequence, data (transaction data) registered in the scale 2 is added by customer No. or clerk No. per each weighed article or non-weighed article and then transmitted to the center machine 1 in sequence and saved by the transaction file at side of the center machine 1 and controlled. More specifically, at the clerk system, the transaction data is controlled in the center machine 1 by the clerk No. At the center system, the transaction data is controlled in the center machine 1 by the customer No.

The key operation is performed when the register mode changing switch 10 is set to "REG" position. In the case of weight registration of PLU, the registration is performed by the ten-keys 14 and the "#" key 22 is pushed, thereby the customer No. is registered (only at the customer system). Further, the registration is performed by the ten-keys 14 and the PLU key 24 is pushed and the PLU No. is set, and the weight measuring is performed and then the clerk keys 15 comprising 1-10 are pushed, thereby it is stored in the transaction buffer. In the case of weight registration of Non PLU, the customer No. is registered and then the PRICE key 21 is pushed and the registration is performed by the ten-keys 14 and the unit price is set. After the weight measuring, the clerk keys 15 are pushed. In the case of non-weighed registration of PLU, the operation is similar to Non PLU except that the weight measuring action in the weight registration of PLU is not effected. In the case of non-weighed registration of Non PLU, the customer No. is registered and then the "H" key 19 is pushed and the registration is performed by the ten-keys 14 and the price is set and the clerk keys 15 are pushed. In any case, since the clerk No. (four columns) corresponding to the clerk keys 15 is assigned by the clerk assigning as above described, the clerk No. can be registered by one-touch operation of the clerk keys 15.

FIG. 17 shows the data format of the transaction sign-off text, and section "0300" represents the command of sign-off. If the registration is started at some scale 2 to the center machine 1 according to the transaction sequence, it is deemed as sign-off state. However, if the sign-off text is transmitted to the center machine 1, before the sign-off action in the scale 2, the registration at the same customer No. or clerk No. from other scale is inhibited thereby the operation mistake is prevented. The key operation of sign-off becomes effective by pushing the "#" key 22 and the clerk keys 15 comprising 1-10 after the registration operation of non-weighed registration or weighed registration as above described. That is, the sign-on state is performed at the same time to the registration automatically, and it means the starting of the registration in some scale. On the contrary, the sign-off state means the ending of the registration but requires the key operation by the clerk. There is no problem of sign-on or sign-off in the single use of the scale. In the in-line system, however, if the same customer No. or clerk No. is set to plural scales by mistake, the operation mistake may be caused. Consequently, the registration action at the same number is inhibited before the sign-off action from sign-on as above described.

Figures 18, 19, 20:
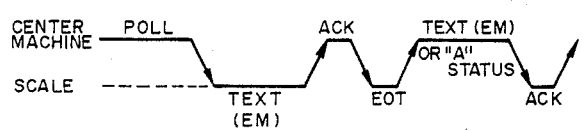
FIG. 18 is a sequence diagram of total amount request.
FIGS. 19 and 20 are diagrams illustrating a data format of total amount request.

FIG. 18 shows the sequence of total amount request in the transaction sequence. If the total amount request text is transmitted corresponding to the POLLING from the center machine 1 and therefore the transmitted data is accepted in the center machine 1, the text including total amount is transferred from the center machine 1. If the transmitted data is not accepted in the center machine 1, the state response "A" together with the error status is transferred. FIG. 19 shows the data format of the total amount request text, and section "0100" represents the command of total amount request. FIG. 20 shows the format of receiving data corresponding to this, and the total amount is added. If the thermal printer 6 is operated on the basis of the receiving data, the customer total receipt can be issued. The register mode changing switch 10 is set to the "REG" position, and the "*" key 20 is pushed so as to produce the total amount indicating mode, and then the clerk keys 15 are pushed, thereby the total amount may be indicated.

Figure 21:
FIGS. 21 and 22 are sequence diagrams of receipt issuing request.
Figure 22:
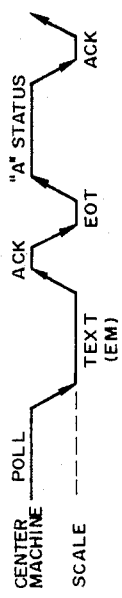

FIG. 21 and FIG. 22 show the sequence of receipt issuing request (transaction request) in the transaction sequence. FIG. 21 shows the case of request acceptance, where text of the receipt issuing request is transmitted from side of the scale 2 in response to the POLLING from the center machine 1. FIG. 23 shows the data format of the text, and section "0101" represents the command of the receipt issuing request. If the transmitted data from side of the scale 2 is accepted in the center machine 1 (ACK response), the center machine 1 transfers the print data to the scale 2 on the basis of the transaction data or the like. FIG. 24 shows the format of the receiving data in the scale 2, and various data of item, total as hereinbefore described are included. When the scale 2 has received the last text TEXTn including EM, the center machine 1 transfers the command=892=receipt inspection, thereby the normal receiving of the receipt print text to the receipt issuing request is confirmed. The state response "F" is transmitted from side of the scale 2 thus the operation is finished. The thermal printer 6 is operated on the basis of such receiving data, thereby the receipt can be issued. FIG. 22 shows the sequence in the case of rejection of the receipt issuing request and the process is ended by transmitting the "A" status.

According to the embodiment as above described, since the transaction data is controlled finely by the center machine, not only the receipt can be issued at the center machine but also it can be issued at any scale by receipt issuing request from side of the scale, so that the in-line system becomes suited to each shop and easy for the use. More specifically, in floating system (clerk system) for example, since one clerk performs selling service for one customer, the customer total receipt can be issued on the basis of the clerk number control, thereby articles desired by the customer can be readily known and the fine customer service such as consulting sale or article advice can be performed. If the customer does not yet decide what is to be bought, the active selling service such as article explaining, cooking manner or menu can be made. On the contrary, in a shop or a department which is always crowded, if the floating system is not efficient, it may be changed into clerk fixed system (customer system) for the rapid selling service. If the customer total receipt is issued exclusively in a definite scale 2 or a center machine 1 then, clerks of the samll number can treat services for many customers. Since the changing between both systems is performed according to the changing information supplied from the center machine 1 to each scale 2, the changing action is easy and suited to the daily condition or the crowded state of customers.

What is claimed is:

1. Counting in-line system, wherein a center machine and a plurality of scales having receipt issuing function are in-line connected to each other, centralized control of transaction data per each weighed article or non-weighed article registered in the scale is performed by said center machine which is selectively changeable between a floating system and a clerk fixed system, said transaction data being controlled in the center machine by the clerk number in the clerk fix system and being controlled by the customer number in the floating system, and print data is supplied from the center machine to the scale on the basis of receipt issuing request from side of the scale so as to issue the customer total receipt.

2. Counting in-line system as set forth in claim 1, wherein the registration is possible from any scale connected to the center machine, and a customer total receipt can be issued from any scale.

3. Counting in-line system as set forth in claim 1, wherein starting of the registration at some scale to the center machine is deemed as sign-on state, and before the sign-off action at this scale, the registration by the same customer number of clerk number from other scale is inhibited.

4. Counting in-line system as set forth in claim 1, wherein changing information between the floating system and the clerk fixed system is in-line supplied to each scale so as to change both systems.

5. Counting in-line system as set forth in claim 1, wherein each scale has clerk keys to enable the registration of the clerk number corresponding to each clerk.

6. Counting in-line system as set forth in claim 1, wherein in the clerk fixed system the clerk number is transferred to the center machine and in the floating system only the customer number is noticed by the center machine.

7. Counting in-line system, wherein a center machine and a plurality of scales having receipt issuing function are in-line connected to each other, centralized control of transaction data per each weighed article or non-weighed article registered in the scale is performed by said center machine which is selectively changeable between a floating system and a clerk fixed system, said transaction data being controlled in the center machine by the clerk number in the clerk fix system and being controlled by the customer number in the floating system, and print data is supplied from the center machine to any scale on the basis of receipt issuing request from side of the scale so as to issue the customer total receipt.

* * * * *